US011506625B2

(12) United States Patent
Jackman et al.

(10) Patent No.: US 11,506,625 B2
(45) Date of Patent: Nov. 22, 2022

(54) DIAMOND-BASED SENSOR DEVICE FOR USE IN HOSTILE ENVIRONMENTS

(71) Applicant: UCL Business LTD, London (GB)

(72) Inventors: Richard B. Jackman, London (GB); Ralph Jennings-Moors, London (GB); Alexander C. Pakpour-Tabrizi, London (GB); William Parfitt, London (GB); Joseph O. Welch, London (GB)

(73) Assignee: UCL Business LTD, London (GB)

( * ) Notice: Subject to any disclaimer, the term of this patent is extended or adjusted under 35 U.S.C. 154(b) by 838 days.

(21) Appl. No.: 16/081,852

(22) PCT Filed: Mar. 3, 2017

(86) PCT No.: PCT/GB2017/050580
§ 371 (c)(1),
(2) Date: Aug. 31, 2018

(87) PCT Pub. No.: WO2017/149323
PCT Pub. Date: Sep. 8, 2017

(65) Prior Publication Data
US 2019/0064099 A1 Feb. 28, 2019

(30) Foreign Application Priority Data
Mar. 3, 2016 (GB) ..................... 1603680

(51) Int. Cl.
*G01N 27/28* (2006.01)
*G01N 27/07* (2006.01)
(Continued)

(52) U.S. Cl.
CPC .......... *G01N 27/28* (2013.01); *G01D 11/245* (2013.01); *G01N 21/09* (2013.01); *G01N 27/07* (2013.01); *G01N 27/308* (2013.01)

(58) Field of Classification Search
CPC ...... G01N 27/28; G01N 27/308; G01N 27/07; G01N 21/09; G01D 11/245
See application file for complete search history.

(56) References Cited

U.S. PATENT DOCUMENTS 6,115,528 A     9/2000  Schmucker et al.
6,267,866 B1 *  7/2001  Glesener ............ C02F 1/46109
                                                        205/450

(Continued)

FOREIGN PATENT DOCUMENTS

EP    2 028 483 A2   2/2009
EP       2442077 A1  4/2012
(Continued)

OTHER PUBLICATIONS

Mahe et al. "Electrochemical reactivity at graphitic micro-domains on polycrystalline boron doped diamond thin-films electrodes" Electrochimica Acta 50 (2005) 2263-2277 (Year: 2005).*
(Continued)

*Primary Examiner* — Samuel P Siefke
*Assistant Examiner* — Qu B Vo
(74) *Attorney, Agent, or Firm* — Hamilton, Brook, Smith & Reynolds, P.C.

(57) ABSTRACT

A sensor device is provided to sample data from a fluid in a sealed environment. The sensor comprises a housing and a diamond within the housing. The housing is formed such that the device is reversibly insertable into the sealed environment so that the diamond directly interfaces with the sealed environment.

32 Claims, 6 Drawing Sheets

(51) Int. Cl.
*G01D 11/24* (2006.01)
*G01N 21/09* (2006.01)
*G01N 27/30* (2006.01)

(56) References Cited

U.S. PATENT DOCUMENTS

| | | | |
|---|---|---|---|
| 6,573,734 | B2 | 6/2003 | He et al. |
| 2008/0202944 | A1 | 8/2008 | Santoli et al. |
| 2011/0005942 | A1* | 1/2011 | Kohn .............. G01N 27/414 |
| | | | 205/794.5 |
| 2014/0130587 | A1 | 5/2014 | Von Herzen et al. |
| 2014/0246315 | A1 | 9/2014 | Hall et al. |
| 2015/0060267 | A1 | 3/2015 | Mollart et al. |
| 2015/0102266 | A1* | 4/2015 | Bitziou .............. G01N 27/308 |
| | | | 252/502 |

FOREIGN PATENT DOCUMENTS

| | | | | |
|---|---|---|---|---|
| EP | 2686672 | B1 | 3/2014 | |
| GB | 2404738 | A | 9/2005 | |
| WO | WO2007107844 | A1 * | 9/2007 | .......... G01N 27/308 |
| WO | 2012126802 | A1 | 9/2012 | |
| WO | WO 2013/087797 | A1 | 6/2013 | |
| WO | WO 2014026929 | A1 * | 2/2014 | .............. G02B 6/42 |
| WO | WO 2014/177433 | A1 | 11/2014 | |
| WO | WO 2015/049344 | A1 | 4/2015 | |

OTHER PUBLICATIONS

Yan et al. "The preparation and properties of Y2O3/AlN anti-reflectionfilms on chemical vapordeposition diamond" Thin Solid Films 520 (2011) 734-738 (Year: 2011).*

Sires et al. "Catalytic behavior of the Fe3+/Fe2+ system in the electro-Fenton degradation of the antimicrobial chlorophene" Applied Catalysis B: Environmental 72 (2007) 382-394 (Year: 2007).*

Murakami et al. "Electrolytic Synthesis of Ammonia from Water and Nitrogen under Atmospheric Pressure Using a Boron-Doped Diamond Electrode as a Nonconsumable Anode" Electrochemical and Solid-State Letters, 10 (4) E4-E6 (2007) (Year: 2007).*

Macpherson, J. "A practical guide to using boron doped diamond in electrochemical research" Phys. Chem. Chem. Phys., 2015, 17, 2935-2949 (Year: 2015).*

Pugh, E. "Note: Moissanite backing plates for use in diamond anvil high pressure cells" Review of Scientific Instruments 87, 036102 (2016) (Year: 2016).*

Matsuishi et al. "Equation of state and intermolecular interactions in fluid hydrogen from Brillouin scattering at high pressures and temperatures" The journal of chemical physics, 118(23): 10683-10695 2003-06 (Year: 2003).*

Jenei et al. "High-temperature experiments using a resistively heated high-pressure membrane diamond anvil cell" Review of Scientific Instruments 84, 095114 (2013) (Year: 2013).*

Notification Concerning Transmittal of International Preliminary Report on Patentability dated Sep. 13, 2018, The International Bureau of WIPO, Athina Nickitas-Etienne.

A. Denisenko, G. Jamommarn, H. El-Hajj, E. Kohn; "pH sensor on O-terminated diamond using boron-doped channel," Diamond & Related Materials 16 (2007) 905-910.

H. Girard, N. Simon, D. Ballutaud, M. Herlem, A. Etcheberry, "Effect of anodic and cathodic treatments on the charge transfer of boron doped diamond electrodes," Diamond and Related Materials, 16 (2007), pp. 316-325.

Hongbin Yu, Hua Wang, Xie Quan, Shuo Chen, Yaobin Zhang; "Amperometric determination of chemical oxygen demand using boron-doped diamond (BDD) sensor," Electrochemistry Communications 9 (2007) 2280-2285.

Jakob Hees, Rene Hoffmann, Armin Kriele, Waldemar Smirnov, Harald Obloh, Karlheinz Glorer, Brian Raynor, Rachid Driad, Nianjun Yang, Oliver A. Williams, and Christoph E. Nebel, "Nanocrystalline Diamond Nanoelectrode Arrays and Ensembles," ACS Nano, (2011), 5, 3339-3346.

Laura Hutton, Mark. E. Newton, Patrick R. Unwin, and Julie V. Macpherson; "Amperometric Oxygen Sensor Based on a Platinum Nanoparticle-Modified Polycrystalline Boron Doped Diamond Disk Electrode," Anal. Chem. (2009), 81, 1023-1032.

Masafumi Domae, Junichi Tani, Kazutoshi Fujiwara and Yosuke Katsumura; "An in Situ Raman Spectroscopy System for Long-term Corrosion Experiments in High Temperature Water up to 673 K," Journal of Nuclear Science and Technology, 43 (2006), 675-680.

P Bergonzo, F Foulon, R.D Marshall, C Jany, A Brambilla, R.D McKeag, R.B Jackman; "Thin film diamond alpha detectors for dosimetry applications," Diamond and Related Materials, 8, (1999), 952-955.

P. Bergonzo, F. Foulon, A. Brambilla, D. Tromson, C. Jany, S. Haan; "Corrosion hard CVD diamond alpha particle detectors for nuclear liquid source monitoring," Diamond and Related Materials, 9, (2000), 1003-1007.

P. Koidl, C.-P. Klages; "Optical applications of polycrystalline diamond," Diamond and Related Materials, 1, (1992), 1065-1074.

Q.T. Tran, M. Pomorski, J. de Sanoit, C. Mer-Calfati, E. Scorsone, P. Bergonzo, "Optimization of Actinides Trace Precipitation on Diamond/Si PIN Sensor for Alpha-Spectrometry in Aqueous Solution," Nuclear Science, IEEE Transactions on, 61, (2014), 2082-2089.

T. H. Borst, and O. Wei; "Boron-Doped Homoepitaxial Diamond Layers: Fabrication, Characterization, and Electronic Applications," Physica Status Solidi, A154, 423 (1996).

International Search Report and Written Opinion from PCT Serial No. PCT/GB2017/050580 dated May 11, 2017.

* cited by examiner

Fluid flow

Fig. 5a

Fluid flow

DIAMOND-BASED SENSOR DEVICE FOR USE IN HOSTILE ENVIRONMENTS

FIELD

The present application relates to a sensor device operable to sample data from a fluid in a sealed environment.

BACKGROUND

Analysing or monitoring the composition of gases or liquids in harsh environments, such as water cooling systems that may be at high pressures, such as 300 bar, and/or elevated temperatures, such as 350° C., is currently achieved through occasional manual sampling and ex situ analysis operations. It would be highly advantageous to have a sensor in direct contact with the fluid medium capable of giving real-time continuous measurement capability. Such a device would find use within, for example, chemical or radiological reactor environments where, in addition to elevated temperatures and/or pressures, an aggressive chemical and/or radiological environment can be encountered which is detrimental to currently available sensor materials. It is established that diamond, both in its intrinsic state, where it is electrically insulating, or doped with foreign species such that it shows electrical semiconducting or electrical metallic properties [1], can be useful as an active material for sensing in hostile environments. In particular, it has been shown that diamond-based sensors are capable of measuring the oxygen content [2-4] and pH of water [5,6] and can lead to the detection of radio-nuclides in water or other fluid environments [7-9].

The most accurate method to determine pH is to use an ion-sensitive field effect transistor (ISFET). Such a device is similar to a metal-oxide semiconductor field effect transistor (MOSFET), but without a gate, with the gate voltage being applied to the solution and the threshold voltage being modified by the presence of ions in the solution. Diamond ISFETs can be fabricated using, for example, diamond containing boron [10]. In this example, thick boron-doped diamond (BDD) regions form the source and drain regions of the ISFET, with a thinner BDD material acting as the channel of the ISFET.

It is also possible to use the impurity (for example, boron) doped diamond to measure the electrical conductivity of an adjacent fluid [11,12]. Diamond can tolerate a large voltage range before the onset of the redox reaction involving the unwanted production of hydrogen and oxygen in an aqueous environment. This so-called electrochemical 'window' enables operation of sensors based on electrochemical effects at extended voltages in fluid environments with a larger voltage range than is normally encountered with other electrochemical sensor materials. In turn this means a large range of species can be detected through this approach with improved sensitivity [13-15].

Although the use of BDD as the working electrode of such a sensor can lead to the electrochemical determination of oxygen [16], the sensitivity of the measurement is significantly improved if the BDD is coated with, for example, platinum (Pt) nanoparticles [17]. Further, diamond surfaces can be chemically modified to support a chemical or biological species which can be used to further enhance the range of species that the sensor can detect. This process, often termed 'functionalisation', can also lead to very stable sensor performance compared to the utilisation of this approach with other materials [18].

It is well-known that diamond is also a good window material for the transmission of visible and infra-red light, with little or no loss of light intensity that commonly occurs with other materials. The small number of non-diamond materials that are transmissive to visible and infra-red lack chemical and/or mechanical resilience. For example, calcium fluoride ($CaF_2$) and zinc selenide (ZnSe) are commonly used infra-red window materials but only display a Knoop hardness value of 158 and 120 respectively, compared to 7000 for diamond. It has been previously reported that such an optical component if sufficiently large may find several applications [19,20]. For example, the use of a diamond as a window material may enable optical spectroscopic determination of events occurring in a fluid beyond the window boundary. The application of a light source through the window for sensing applications in elevated temperature aqueous environments has been previously described, for example in the case of Raman spectroscopy [21,22].

As outlined above, diamond lends itself well both to sensing (electrically and optically) and to excellent resilience in harsh environments. However, there has been comparatively little work on providing a resilient housing for such diamond sensors in harsh environments.

SUMMARY

The present application provides a sensing device for use in a harsh fluid environment. The sensing device includes a diamond (diamond element) appropriately modified and packaged for making electronic or optical measurements of the environment. The diamond element may be formed as a disc of mono- or micro-crystalline diamond. The diamond element provides a sealed boundary between the harsh environment and a non-harsh environment (typically corresponding to normal working conditions, such as conditions suitable for human activity). The sealed boundary may be implemented, for example, using a mechanical or fusion seal (braze/weld/frit) to mount the diamond element into a housing. The housing allows the diamond element to interface with optical and electrical components utilised for sensing. Note that the diamond element may itself be used actively for sensing the fluid environment, or may be used passively, such as to provide an optical and/or electrical window or path into the fluid environment (for the sensing thereof).

The housing may support repeated insertion into (and removal from) the sealed environment, or more specifically, a container structure (such as a pipe) in which the sealed (harsh) environment is maintained. Such an insertion positions the sensing device so that it interfaces with, and hence is able to monitor and measure, the sealed environment. In general, the insertion is such that only a portion of the sensing device (the diamond element and the section of the housing immediately around it) directly contact the sealed environment.

As used herein, in the context of a dynamic fluid environment, a harsh environment typically indicates a temperature (or temperatures) in the range −50° C. and 350° C., a pressure (or pressures) in the range of $10^{-6}$-200 bar, and/or a pH value (or values) in the range 1-14. It will be understood that such a harsh environment typically has an ability to corrode (e.g. via galvanic corrosion or otherwise). In contrast, in the context of a dynamic fluid environment, a non-harsh environment may indicate room temperature and pressure conditions (for example), and/or an environment in which there is relatively little corrosion, although in some cases a non-harsh environment may sometimes have an elevated temperature and/or pressure (compared to room temperature and pressure).

A sensing device described herein generally has a first (front) side of the diamond element in contact with the harsh environment; likewise the housing is at least partly in contact with the harsh environment. Conversely, the second (rear/opposing) side of the diamond element is in contact with the non-harsh environment (and sealed apart from the harsh environment).

In some implementations, the diamond element acts as a window allowing light (such as optical and/or infrared radiation) to pass through into the sealed environment. This light can then be used for optical sensing of the fluid within the sealed environment.

In some implementations, the sensing device comprises a diamond element, a metallic or ceramic housing (such as a bolt, containing appropriate modifications for mechanical or fusion sealing), passive optical components (such as fibers and lenses) and active optical components (such as cameras, light sources and detectors). In some implementations, the optical components may all be integral to the metallic or ceramic housing; alternatively, some or all of the optical components may be external to the housing. In either case, the optical components are generally located outside the sealed (harsh) environment.

In some implementations, the diamond element may allow light of a narrow or wide range of wavelengths (e.g. 0.23-100 μm) to pass from the front side (interfacing the sealed, harsh environment) to a back or rear side (interfacing the non-harsh environment). The diamond element may also allow light of a narrow or wide range of wavelengths (e.g. 0.23-100 μm) to pass in the opposite direction, namely from a back or rear side (interfacing the non-harsh environment) to a front side (interfacing the sealed, harsh environment). In this latter case, the sensing device acts as a light source for providing light into the harsh environment. The light may then be detected, after propagating through the harsh environment, by a different (or the same) sensing device, to measure (for example) the transmission, reflection and/or absorption properties of the fluid(s) within the sealed environment.

In such a sensing device, the metallic or ceramic housing allows the diamond to be mounted for interfacing with the sealed environment, while maintaining a leak-resistant seal between the two (harsh and non-harsh) environments. The housing also allows for the insertion of the sensing device into a larger structure containing the harsh environment (such as a radiological reactor). Passive and/or active optical components may be included in the sensing device to allow optical measurements to be made of the harsh environment, such as (but not limited to) video, Raman spectroscopy, infra-red spectroscopy, etc.

In other implementations, the diamond element is able to act as an electrical material for electronic sensing. For example, the first (front) side of the diamond element, which interfaces with the sealed environment, may contain regions of doped diamond to provide areas of electrical conductivity. These regions can be used to form multiple sensing components, such as for the independent real-time monitoring of various metrics. The layered growth mechanism of diamond enables layers of intrinsic, semi-conducting or metallic diamond to be grown in or on such a diamond element.

Such implementations may comprise a metallic or ceramic housing, such as a bolt, together with an internally located diamond element and a mechanical or fusion seal. Such implementations may further comprise passive electrical components (such as wires and connectors) and/or active electrical components (such as control and read-out circuits). In some implementations, the electrical components may all be integral to the metallic or ceramic housing; alternatively, some or all of the electrical components may be external to the housing. In either case, the electrical components are generally located outside the sealed (harsh) environment.

In some implementations, the diamond element contains conductive channels to allow electrical connections between the first (front) side and the second (rear, opposing) side of the diamond element. The conductive channels may, for example, be metallic or impurity-based (such as graphite). As for other implementations described above, a metallic or ceramic housing may be provided with a mounting for the diamond element that includes a leak-resistant seal to help maintain the separation (seal) between the two environments (harsh and non-harsh). The electrical components are generally arranged on the second (rear) side of the diamond element (or window). The housing may be designed for (repeated) insertion into a larger structure which contains the harsh environment, such as a radiological reactor. The (passive and active) electrical components then allow electrical measurements to be made of the harsh environment, such as, but not limited to, electrochemical sensing, pH sensing, conductivity, etc.

In some implementations, the diamond element acts both as an optical and electrical material for optical and electrical sensing. Such implementations of a sensing device may incorporate both optical and electrical components (or connectors), and hence support more complex monitoring or measurements.

The approach described herein allows a diamond sensor to be suitably packaged for deployment at the boundary between a harsh and a non-harsh environments—for example, by insertion into a structure that is used to contain (and seal) the harsh environment (typically within a surrounding non-harsh environment). The present approach provides an integrated design for a modular platform, in which various sensor devices (e.g. for optical and/or electrical monitoring) can be combined and flexibly implemented based on the requirements of a particular application. Such a combination provides enhanced real-time analytical capabilities compared with individual sensor platforms, and also obviates the need for manual sampling. Further, by the use of a suitable housing, such a device can be readily inserted into existing infrastructure and removed or replaced as necessary.

Thus a multi-functional diamond-based sensor as disclosed herein can be used for performing chemical, biological, physical and/or optical spectroscopic analysis in harsh fluid environments—e.g. with high temperature, high pressure, and/or chemically aggressive substances. Such a sensor may be packaged into (with) a resilient and versatile housing to form a sensor device for use in sensing in harsh fluid environments, such as in the field of electrical and optical fluid analysis, for example, in the analysis of fluids in harsh environments.

BRIEF DESCRIPTION OF THE DRAWINGS

The invention will now be described, by way of example only, with reference to the accompanying drawings, of which:

FIG. 1 provides sectional views of various sensor devices having a diamond element mounted to (in) a housing to form a seal. In particular.

FIG. 2 provides simplified schematic representations (sectional views) of various sensor devices having a diamond element mounted to (in) a housing to form a seal. In particular.

FIG. 5 illustrates a sensor device having a housing in the form of a bolt, which is inserted into a pipe for monitoring a fluid in the pipe. In particular.

FIG. 6 illustrates multiple sensor devices inserted into a pipe for making various optical and electrical measurements of a fluid in the pipe, and further shows a valve mechanism to allow isolation of the fluid in the pipe. In particular.

Please note that reference herein to FIG. 1 should be understood as a collective reference to FIG. 1a, FIG. 1b and FIG. 1c, and analogously for FIGS. 2, 5 and 6.

DETAILED DESCRIPTION

Figures 1A, 1B, 1C, 2A, 2B:
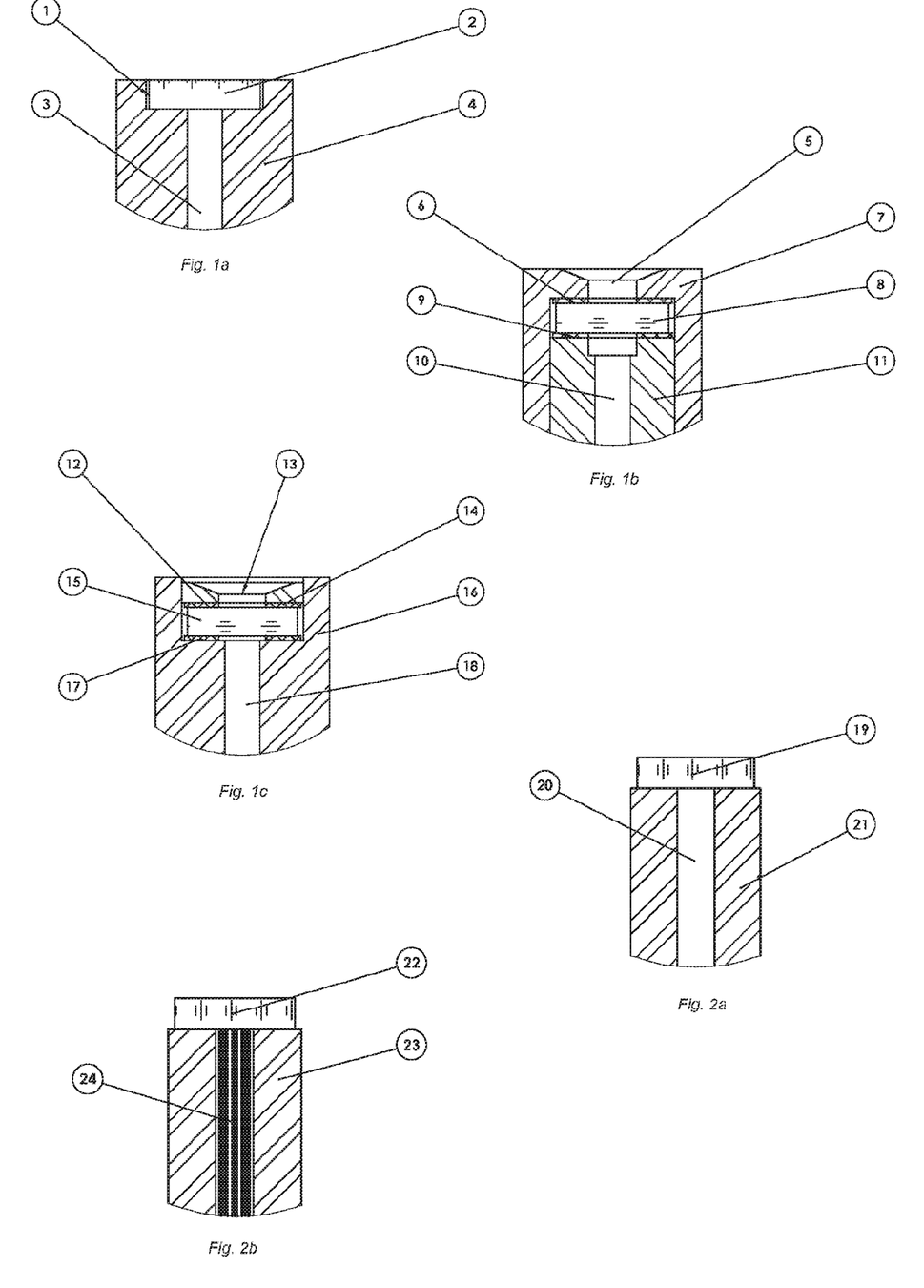
FIG. 1*a* shows a device having a fusion seal.
FIG. 1b shows a device having a mechanical seal located at the rear face of the diamond element (i.e. facing away from the sealed environment)
FIG. 1c shows a mechanical seal located at the front face of the diamond element (i.e. interfacing with the sealed environment).
FIG. 2a shows a portion of a device in which the diamond element acts solely as a pressure boundary against a harsh (sealed) environment.
FIG. 2b shows a portion of a device in which the diamond element acts as an optical window, with optical fibers on the rear side of the diamond element and extending away through a central conduit.

FIG. 1 shows three section views (denoted FIG. 1a, FIG. 1b and FIG. 1c), each showing a respective implementation of an object or device for use as a sensor. For each implementation shown, the object is cylindrically symmetrical object—i.e. the object has some degree of rotational symmetry about a central longitudinal axis that extends towards the top of the page. In addition, each implementation comprises a housing with an opening (aperture or recess) in which the housing a diamond element is mounted. On the opposite side of the diamond element (away from the aperture) is a central bore or conduit running through the housing, the central conduit being generally coincident with the central longitudinal axis. The opening generally exposes the diamond element to an environment to be sensed, while the bore provides access and connectivity to the diamond element from a working (non-harsh) environment.

In the implementation of FIG. 1a, a diamond or diamond element 2 is mounted into a metallic (such as stainless steel, carbon steel, titanium) or ceramic housing 4. The housing is recessed at the front (top) to accommodate the diamond element. The housing 4 also has a central bore or conduit 3 running directly through, the central conduit being generally coincident with the central longitudinal axis. The central conduit allows the diamond element to be accessed from the rear (or underside) by optical or electrical components. (It will be appreciated that references such as to the top, rear or underside of the object are for ease of explanation only, and are not intended to limit the range of orientation in which the device may be employed).

The mounting of the diamond element 2 into the housing is required to be such that the diamond element is securely attached to the housing, and can withstand a large gradient in pressure and temperature between a harsh environment on the front (top) side 5, compared with a non-harsh environment on the rear side (such as in the central bore 3). As shown in FIG. 1a, this mounting may be achieved by a fusion joint 1 between the diamond 2 and the housing 4. This mounting may be a welded or frit joint, or may also be a brazed joint, in which case the diamond is attached to the housing by a series of filler metals (such as titanium) inserted into the gap between the diamond element and the housing.

The mounting of the diamond element into the housing can also be achieved by mechanical means, for example, as for the implementation of FIG. 1b, in which a mounting is created by compressing a diamond element 8 between two sealing devices 6, 9. These sealing devices may be gaskets (made of materials such as graphite or gold), polymeric o-rings or metal c-section rings (etc.) which provide an outward sprung tension. The two sealing devices 6, 9 on either side of the diamond element 8 may be different or identical to one another. Note that the seals 6, 9 are intended to prevent leakage of fluid from the harsh environment passing between the diamond element 8 and the housing 7. However, the top (front) seal 6 generally allows the fluid from the harsh environment to contact the diamond element 8 for sensing purposes. For example, as shown in FIG. 1b, the seal 6 has an annular shape about the central longitudinal axis, such that the central top (front) portion of the diamond element is exposed to the harsh environment. The seal 9 on the opposite (rear) side of the diamond element may also have this annular shape (to provide access to the rear face of the diamond element).

The compression of the seals 6, 9 is created by using a cartridge 11 inserted into the rear of the main housing 7. The cartridge contains the central conduit 10 used to access the rear of the diamond element. The cartridge may be screwed into place by a fine internal thread (see FIG. 6c) to allow a precise compression load to be placed onto the diamond element 8 and sealing devices 6, 9; the thread also serves to hold the cartridge in place within the housing 7. This sealing may be reinforced by a welded joint around the bottom of the cartridge. Additionally (or alternatively), a weld or spring-loaded clips may be used independently to hold an un-threaded cartridge in place (such as the one shown in FIG. 1b). The main housing 7 contains an opening 5, on the opposite side of the diamond element 8 to central conduit 10, to allow contact with the harsh fluid environment. This opening 5 may be chamfered or so formed such that favourable (turbulent or laminar) flow conditions are achieved.

FIG. 1c shows an implementation in which a mechanical seal is formed by compression from the front (top) of the housing. Similar to the implementation of FIG. 1b, sealing devices (e.g. gaskets, o-rings or c-rings) 14, 17 are arranged on either side of a diamond element 15. The main housing 16 features a central conduit 18, and a recess or opening at the front to allow the insertion of the diamond element and sealing devices along with a retaining ring 12. This retaining ring may be screwed down and held in place by a fine thread inside the recess (not shown). It may also be welded to the housing (by methods such as electron-beam welding) to secure ring 12 in place (with or without a thread). An opening inside the ring 13 (and likewise within the front seal 14) allows the diamond element to contact the harsh fluid environment. This opening may be chamfered in a similar manner (and for a similar purpose) to the opening 5 shown in FIG. 1b.

Figure 2C:
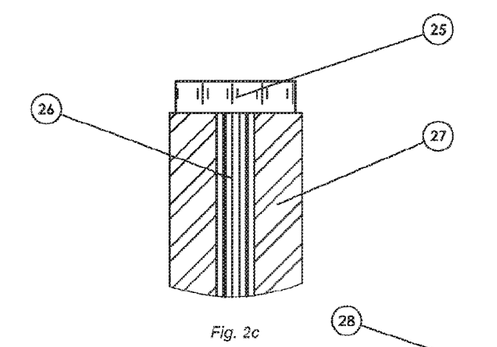
FIG. 2c shows a portion of a device in which the diamond element acts as a multi-functional electrical sensor, with electrical wire connections on the rear side of the diamond element extending away through a central conduit.

FIG. 2 shows three section views (denoted FIG. 2a, FIG. 2b and FIG. 2c), each depicting a respective implementation of a rear (underside) connection for the diamond element. Note that FIG. 2a, FIG. 2b and FIG. 2c only show aspects of this rear connection, and omit other portions of the housing etc, since these do not determine the type of rear connection utilised. Accordingly, it will be understood that any of the rear connections of FIG. 2a, FIG. 2b and/or FIG. 2c may be utilised in combination with any mounting arrangement of FIG. 1a, FIG. 1b and/or FIG. 1c as described above.

The diamond element 19 shown in FIG. 2a is mounted above an empty central conduit 20 within the housing 21. In this implementation, the diamond element acts solely as a high pressure and temperature boundary between the harsh fluid environment (located above or in front of the diamond) and the non-harsh environment (located below or behind the diamond, i.e. on the same side as conduit 20).

The diamond element 22 shown in FIG. 2b is mounted above a central conduit within the housing 23, the central conduit containing a bundle of multiple optical fibres 24. These optical fibres may interface directly to the rear (underside) of the diamond element 22, or an optically transparent adhesive may be used to improve contact between the optical fibres 24 and the diamond element 22. The optical fibres may be inserted into the central conduit along with lenses (including gradient-index, GRIN, lenses) (not shown). The optical fibres can be used to carry light (such as IR, visible, laser) from a source, along the conduit and out through the diamond element—and/or vice versa (back to a detector)—to allow optical analysis of the harsh fluid environment on the front side of the diamond element 22.

The diamond element 25 shown in FIG. 2c is mounted above (in front of) a central conduit within the housing 27, the central conduit containing multiple electrical wires 26. The diamond element in this implementation contains electrically active impurities on the front face (see FIG. 4), and conductive channels (metallic or graphitic) through to the rear face (not shown). The wires 26 may interface directly with the rear of the diamond, where metal contacts may be evaporated onto the diamond element to provide an electrical connection to the conductive channels within the diamond element. The wires 26 may also interface to the diamond element 25 via a connector module (not shown), which may provide a more robust connection to evaporated metal contacts on the rear face of the diamond element. This connector module may take the form of an elastomeric connector or a ceramic module with metallic tracks (for example).

Figure 3:
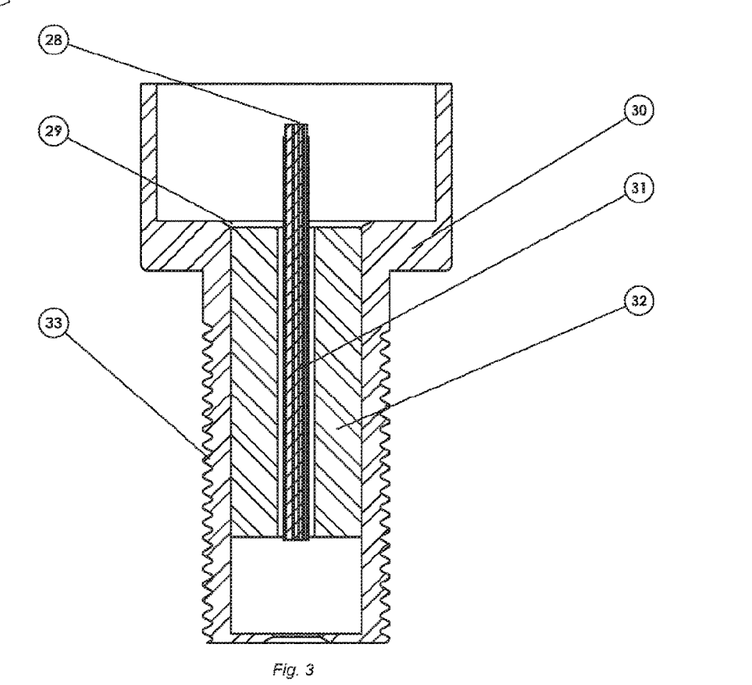
FIG. 3 is a schematic representation of a sensor device in which the housing is formed as a bolt, with electrical wiring extending through a central conduit.

The objects having a mounting and connectivity such as described above in relation to FIG. 1 and FIG. 2 may be integrated into various forms of housing. For example, FIG. 3 shows a device in which the housing 30 may be in the shape of a threaded bolt, i.e. having thread 33. By adopting this form factor (configuration), the diamond element 28 and housing can be screwed into a larger structure, for example, containing a fluid flow, such as a pipe, while remaining easily removable and replaceable by the user.

Note that in the implementation shown in FIG. 3, the diamond element is located at the lower end of the device (the shank of the bolt). This lower end of the device of FIG. 3 further includes a mechanical seal such as the one shown in FIG. 1b, with an un-threaded cartridge 32 held in place by a welded seal around the circumference 29. A bundle of electrical wires extends through the conduit and emerges into a void space at the head of the bolt 28, where further electrical connections, components and functions (such as analog to digital signal conversion) may be located. A similar format can be adopted for optical connections.

Figure 4:
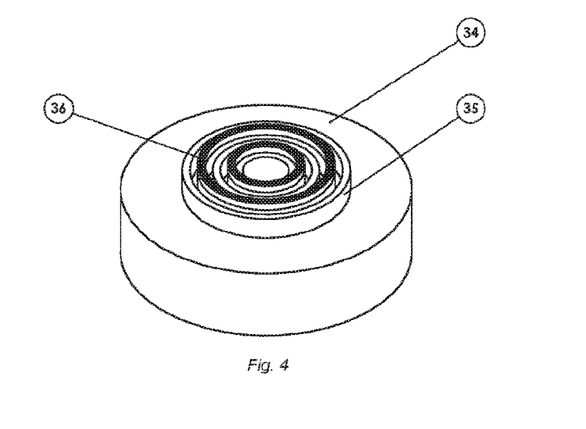
FIG. 4 shows a diamond element with regions of intrinsic, semi-conducting and metallic diamond for electrical sensing in a sensor device described herein.

FIG. 4 shows an implementation of a diamond element which has undergone surface modification for electrical sensing. The part 34 is formed of intrinsic (un-doped), electrically insulating mono- or micro-crystalline diamond material. This part 34 provides the boundary between the harsh and non-harsh fluid environments when mounted into the housing. The part 34 also forms an electrically insulating substrate on which a diamond that contains impurities (such as boron) may be implanted into or grown onto the surface of the intrinsic part 34. By localising these areas of impurities, 35, 36, electrical properties can be modified across the surface of the diamond (in FIG. 4 these areas form concentric rings). The areas of impurities may contain a high concentration of the impurities 35, so that the diamond is conducting, or a lower concentration 36, so that the diamond is semiconducting or insulating. The areas may also be located such that they form layers of these various electrical properties. By this method, the diamond can be used to produce electrical sensors for measuring various fluid metrics, such as, but not limited to: pH, by the use of an ISFET structure; oxygen concentration, by the use of three-electrode electrochemistry; conductivity, by use of conductive regions spaced at various distances; and radioactive species concentration, by use of an ionisation chamber and enhanced by electrochemistry). The areas of impurities 35, 36 may also be surface functionalised to enhance their sensitivity by use of nanoparticles (such as platinum), for example. Note that electrical connections between the front side features of the diamond element and the rear side features of the diamond element are not shown in FIG. 4, although these may be implemented in the form of metallic, or impurity-based channels (such as graphite).

Figure 5A:
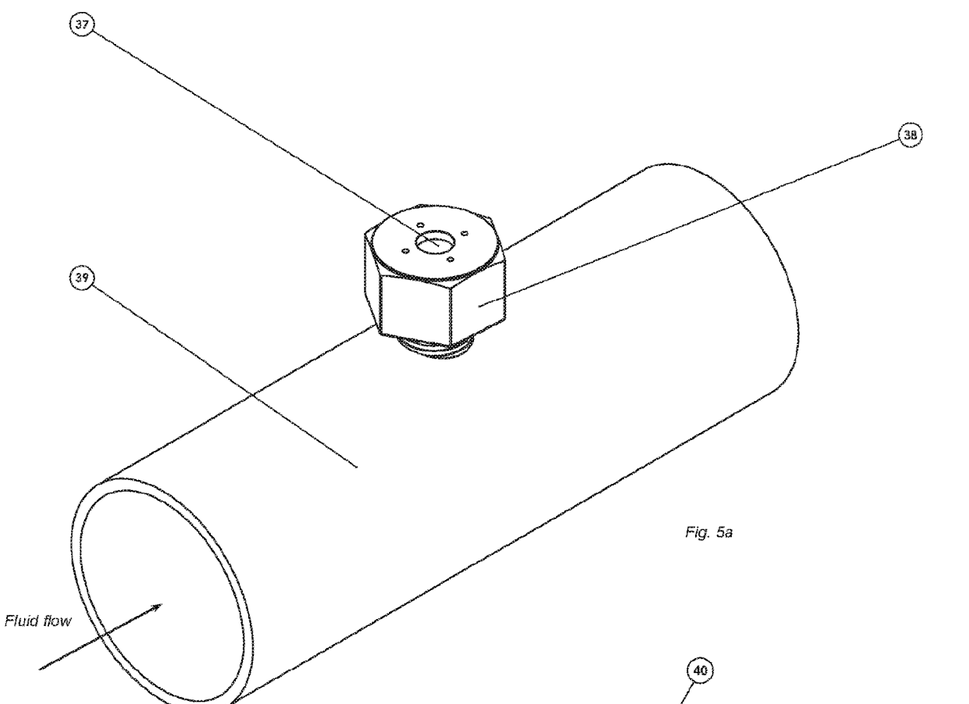
FIG. 5a shows an external view of the sensor device and pipe.
Figure 5B:
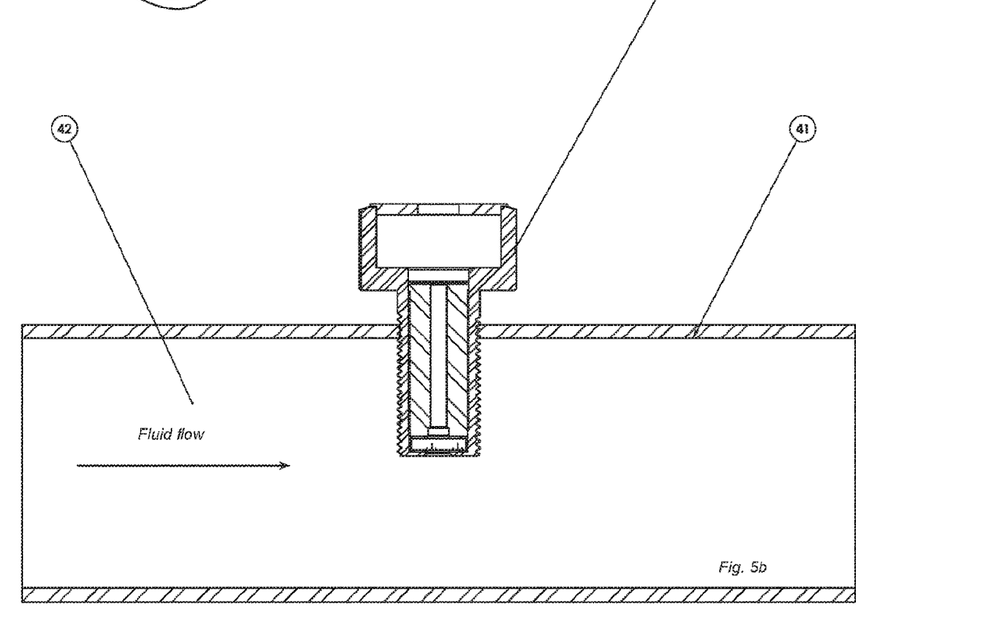
FIG. 5b shows a sectional view of the sensor device and pipe.

The threaded bolt housing for a sensor shown in FIG. 3 is designed to be removable and replaceable for insertion into a larger structure, as illustrated in FIG. 5, in which FIG. 5a shows an external view, and FIG. 5b shows a sectional view, of such an arrangement. The housing 38, 40 containing the diamond element and components can be screwed into a threaded hole within a pipe 39, 41, which may have a continuous fluid flow 42 through it at high temperatures and pressures. The housing 38, 40 has flat faces at the hexagonal head of the bolt to facilitate the insertion and removal of the sensor into the pipe 39, 41. A lid 37 is attached to the top of the head of housing 38 to encapsulate any components located in the void at the head of the bolt (such as shown in FIG. 3), while also allowing a connection to external components to be fitted through the lid. Note that the housing 38, 40 shown in FIG. 5 adopts a mechanical seal, such as the one shown in FIG. 1b, but other forms of seal could be used instead. In addition, for clarity FIG. 5 omits any electrical or optical connections or components, such as shown in FIG. 2, but it will be appreciated that these may be present as required.

Figure 6A:
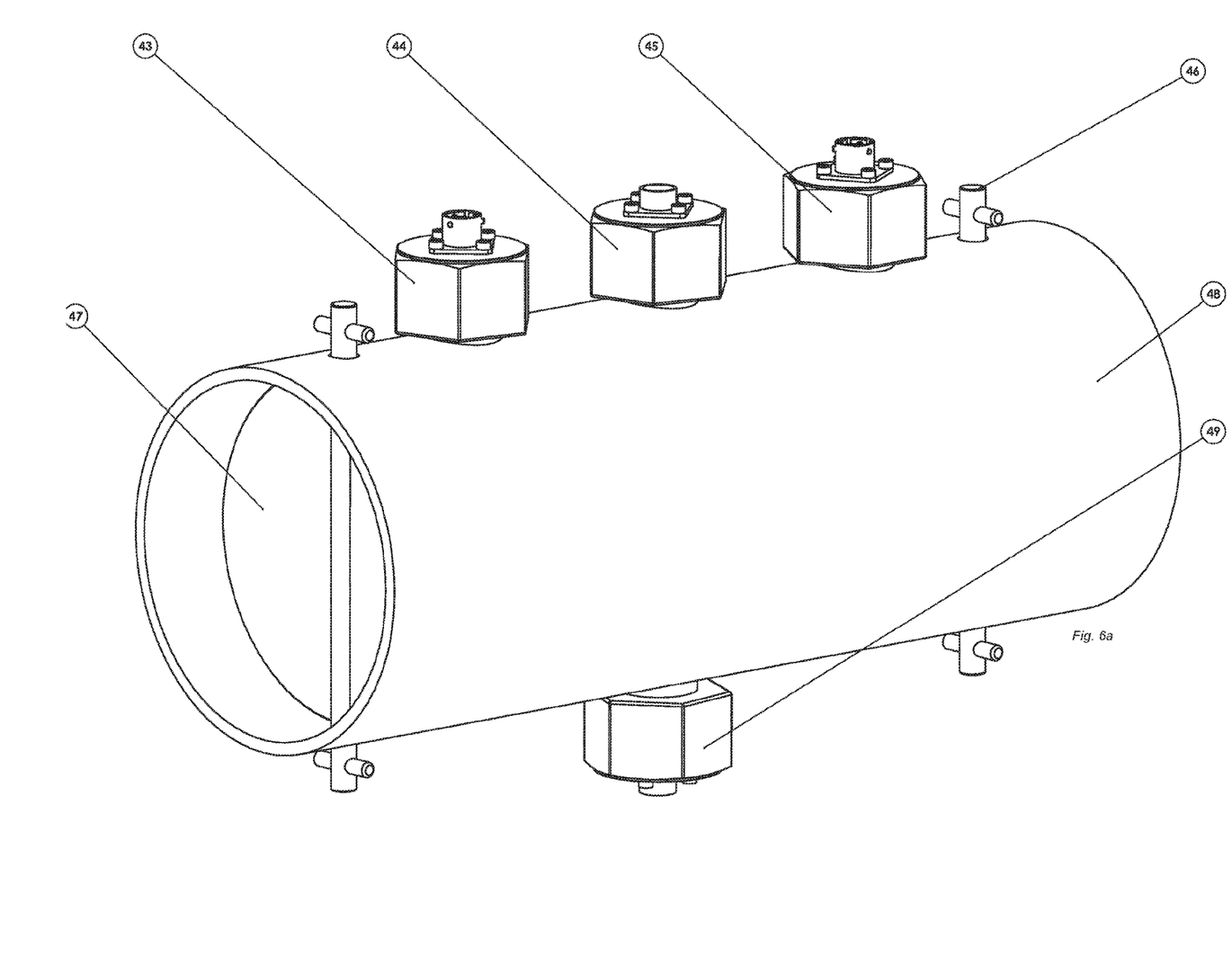
FIG. 6a shows an external view of the sensor devices and pipe.
Figure 6B:
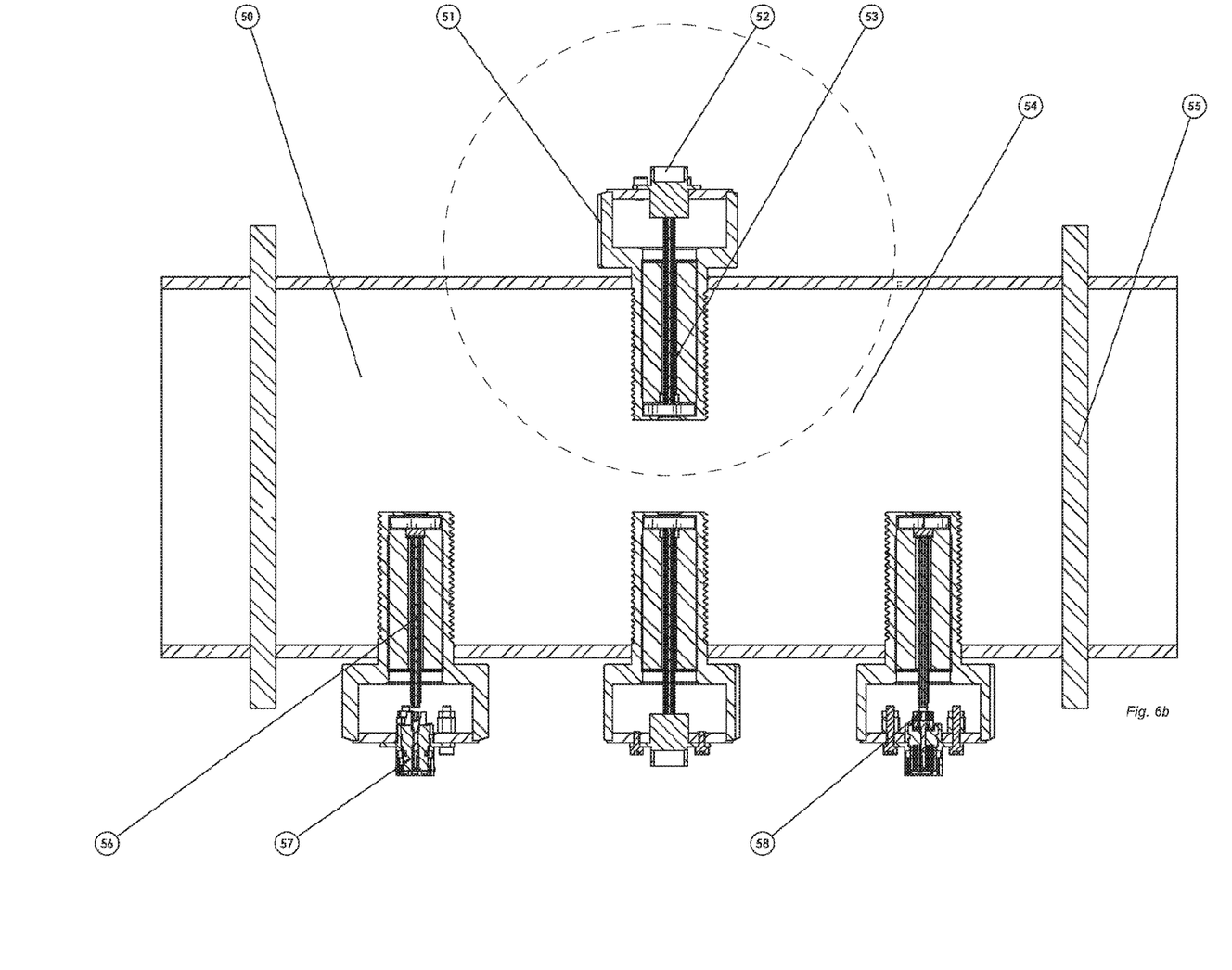
FIG. 6b shows a sectional view of the sensor devices and pipe.
Figure 6C:
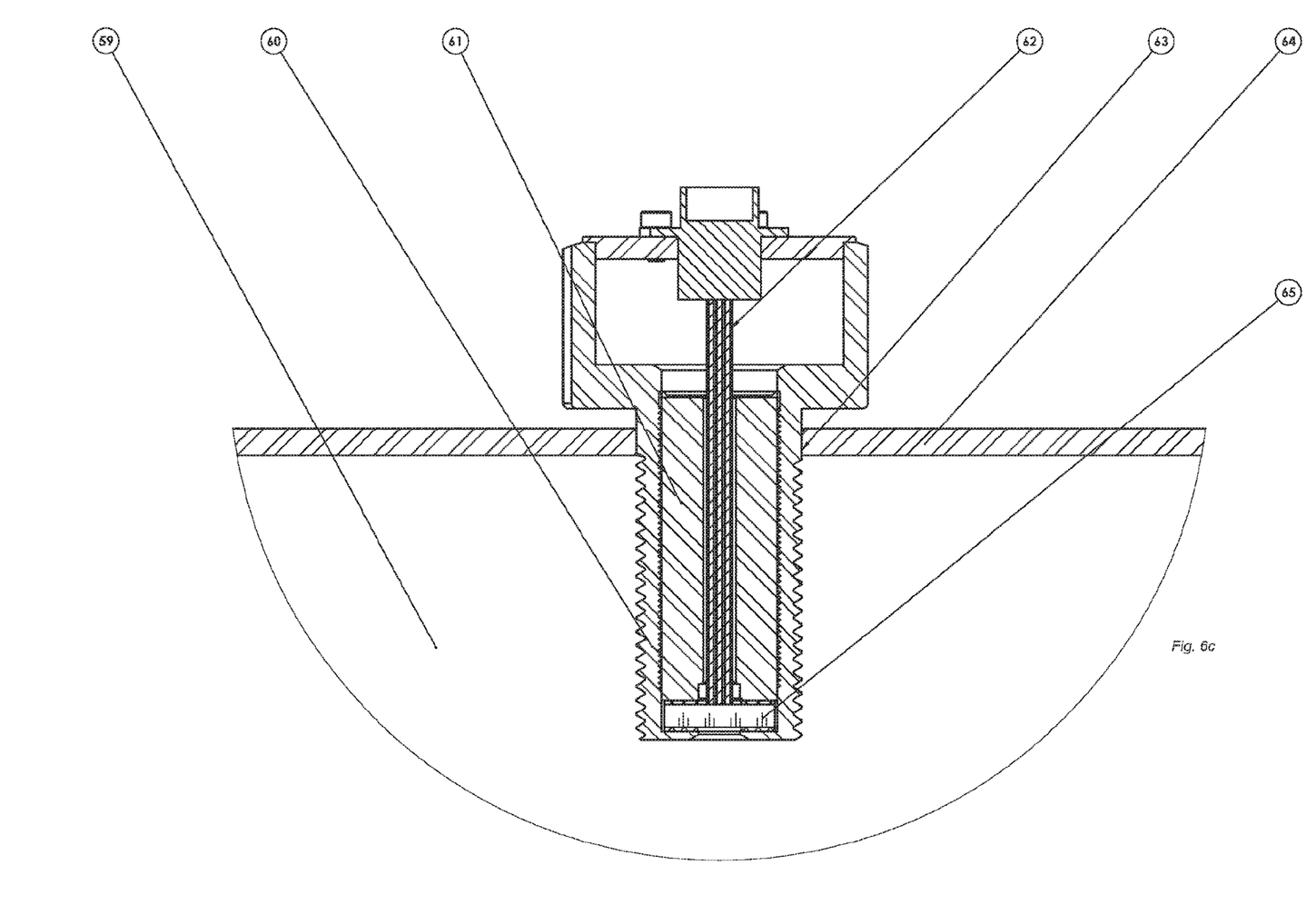
FIG. 6c shows a detail of one sensor device from FIG. 6b.

The arrangement shown in FIG. 5 may be further developed, such as in the example shown in FIG. 6, in which multiple individual sensors are inserted into a larger structure. Thus FIG. 6 includes FIG. 6a showing an external view and FIG. 6b showing a sectional view of such an arrangement, while FIG. 6c shows a detail of FIG. 6b.

In FIG. 6a, the multiple individual bolt housings, containing various diamond elements and components for sensing, 43, 44, 45, 49 are inserted into a larger structure (container), namely pipe 48. This configuration of sensors allows for the fluid (flowing) in pipe 48 to be measured in a number of different ways, in a modular and removable manner, configurable by the user, by inserting or removing individual sensors as appropriate. The elements and components within sensors 43, 44, 45, 49 may be arranged such that electrical and/or optical measurements can be made, for example, pH, conductivity, chemical species concentration, particle size analysis, particle chemistry identification, radiological content identification, and so on. In addition, the individual sensors may be used to make a set of independent measurements, or some of the measurements may be interdependent. For example, housing 49 may provide an optical signal which passes through the pipe fluid to be detected by sensor 44.

In some implementations, the fluid flow through pipe 48 may be controlled by the use of a valve system 46, 47 for example, to allow fluid sample isolation. The valve system 46, 47 might also be utilised to support changing of one or more sensors. In other words, if sensor 44 (for example) is to be removed and replaced by another sensor, then the section of the pipe 48 incorporating sensor 44 could be isolated to prevent or restrict leakage of fluid from the pipe through the hole accommodating sensor 44 during the replacement operation.

FIG. 6b presents a cross-sectional view showing the housings, which contain the diamond elements and components, inserted into the fluid 50, 54 and isolated by a valve system 55. The sensor housings may have either optical 53 or electrical 56 connections and components extending through the central conduit of the housing. In the void or space in the head of the housing bolt, electrical components may be mounted on a circuit board 58. Signals may then be sent from the circuit board 58 through an electrical connector 57 to an external unit containing control and processing electronics (not shown in FIG. 6b); conversely, the external unit may also send signals to the circuit board 58 using the electrical connector 57. Similarly, in the case of optical signals, these optical signals may be fed through an optical (e.g. fibre) connector 52 to an external unit containing sources and detectors (and likewise signals maybe transmitted in the reverse direction over connector 52, e.g. from the external unit to the interior of the sensor housing. For both optical and electrical connections, the external unit may be located in an independently temperature controlled environment (i.e. typically in a much less harsh environment than inside pipe 48).

In some implementations, electrical and optical signals may also be processed in the head of the sensor bolt and transmitted externally by wireless means such as W-Fi, Bluetooth, RF and Li-Fi (not shown). Furthermore, individual housings containing diamond elements and components may be arranged, for example, in a perpendicular, or anti-parallel configuration, such as sensors 44,49, so such that they can create correlated measurements. For example, as mentioned above, this may involve a configuration in which one unit transmits light (such as a laser) into the fluid within the pipe and another unit receives the optical signal after passage through the fluid; the received signal can then form the basis for physical analysis, such as by optical spectroscopy.

FIG. 6c presents a detailed view of sensor 51 screwed into a hole 63 in the pipe 64 containing the fluid 59. The main housing 60 of the sensor 51 is a threaded bolt, with a mechanical seal held by a threaded cartridge 61 screwed into place along a fine internal thread. The front face of the diamond element 65 is exposed to the fluid flow through an opening in the end of the housing 60, while the rear face of the diamond element 65 is interfaced to optical fibres 62 which extend through the central conduit to an optical connector that allows signals to be fed to an external system, such as a computer.

Note that in FIG. 6c, the head of the housing 60 is slightly spaced from the outer surface of the pipe 64. However, in other implementations, the external thread on the housing and the head may be arranged such that the underside of the head is brought into (tight) contact with the outer surface of the pipe 64. This configuration can help to maintain a sealed environment at the join between the pipe and the housing 60.

Other methods of attaching the sensor device for monitoring or measuring the sealed environment may be adopted. For example, rather than the sensor device being receiving into a threaded hole, such a hole may be provided without a thread, but with a slight narrowing towards the sealed environment. The sensor device may be held tightly within such a hole, for example, by closing a cover at the rear of the sensor device (such cover may be retained in the closed position by clips, screws, etc). Another possibility is that one or more sensor devices is/are integrated into a pipe section or similar apparatus. This pipe section can then be installed (on a permanent or temporary basis) at a location where monitoring and/or measurement is to be performed.

Various embodiments and implementations of the invention have been described above. The skilled person will appreciated that the features of these various embodiments and implementations may be modified or combined with one another as appropriate according to the particular circumstances of any given application, and hence are not limited to the particular forms and combinations described in the above examples. The scope of the invention is defined by the appended claims and their equivalents.

REFERENCES

[1] Boron-Doped Homoepitaxial Diamond Layers: Fabrication, Characterization, and Electronic Applications, T. H. Borst and O. Wei; Physica Status Solidi, A154, 423 (1996)
[2] Amperometric determination of chemical oxygen demand using boron-doped diamond (BDD) sensor, Hongbin Yu, Hua Wang, Xie Quan *, Shuo Chen, Yaobin Zhang; Electrochemistry Communications 9 (2007) 2280-2285
[3] Amperometric Oxygen Sensor Based on a Platinum Nanoparticle-Modified Polycrystalline Boron Doped Diamond Disk Electrode, Laura Hutton, Mark. E. Newton, Patrick R. Unwin, and Julie V. Macpherson; Anal. Chem. 2009, 81, 1023-1032
[4] Method for Use of an Electrochemical Sensor and Electrodes Forming Said Sensor US20080202944A1, priority date 22. Apr. 2005
[5] pH sensor on O-terminated diamond using boron-doped channel, A. Denisenko, G. Jamornmarn, H. El-Hai E. Kohn; Diamond & Related Materials 16 (2007) 905-910
[6] Chemical sensor on diamond film, EP2028483A2, priority date 2007 Aug. 22
[7] Thin film diamond alpha detectors for dosimetry applications, P Bergonzo, F Foulon, R. D Marshall, C Jany, A Brambilla, R. D McKeag, R. B Jackman; Diamond and Related Materials, 8, (1999), 952-955
[8] Corrosion hard CVD diamond alpha particle detectors for nuclear liquid source monitoring, P. Bergonzo, F.

Foulon, A. Brambilla, D. Tromson, C. Jany, S. Haan; Diamond and Related Materials, 9, (2000), 1003-1007
[9] Optimization of Actinides Trace Precipitation on Diamond/Si PIN Sensor for Alpha-Spectrometry in Aqueous Solution, Pomorski, M.; de Sanoit, J.; Mer-Calfati, C.; Scorsone, E.; Bergonzo, P.; Nuclear Science, IEEE Transactions on, 61, (2014), 2082-2089
[10] pH sensor on O-terminated diamond using boron-doped channel, A. Denisenko, G. Jamornmarn, H. El-Hai E. Kohn, Diam. & Relat. Mat., 16 (2007), 905
[11] Diamond based electrical conductivity sensor, WO2015049344A1, Priority date 2013 Oct. 4
[12] Integrated thin film liquid conductivity sensor, U.S. Pat. No. 6,573,734B2
[13] Electrochemical apparatus and method, WO2014177433A1
[14] Diamond electrodes for electrochemical devices, US20150060267A1
[15] H. Girard, N. Simon, D. Ballutaud, M. Herlem, A. Etcheberry, Effect of anodic and cathodic treatments on the charge transfer of boron doped diamond electrodes, Diamond and Related Materials, 16 (2007), pp. 316-325
[16] Amperometric determination of chemical oxygen demand using boron-doped diamond (BDD) sensor, Hongbin Yu, Hua Wang, Xie Quan, Shuo Chen, Yaobin Zhang, Electrochem. Comm. 9 (2007), 2280
[17] Amperometric Oxygen Sensor Based on a Platinum Nanoparticle-Modified Polycrystalline Boron Doped Diamond Disk Electrode, Laura Hutton, Mark. E. Newton, Patrick R. Unwinand, Julie V. Macpherson, Anal. Chem. 2009, 81, 1023-1032
[18] Nanocrystalline Diamond Nanoelectrode Arrays and Ensembles, Jakob Hees, Rene Hoffmann, Armin Kriele, Waldemar Smirnov, Harald Obloh, Karlheinz Glorer, Brian Raynor, Rachid Driad, Nianjun Yang, Oliver A. Williams, and Christoph E. Nebel, ACS Nano, 2011, 5, 3339-3346
[19] Large area optical quality synthetic polycrystalline diamond window, WO2013087797A1
[20] Optical applications of polycrystalline diamond, P. Koidl, C.-P. Klages; Diamond and Related Materials, 1, (1992), 1065-1074
[21] An in Situ Raman Spectroscopy System for Long-term Corrosion Experiments in High Temperature Water up to 673 K, Masafumi Domae, Junichi Tani, Kazutoshi Fujiwara and Yosuke Katsumura; Journal of Nuclear Science and Technology, 43 (2006), 675-680
[22] Raman fiber optic probe assembly for use in hostile environments, U.S. Pat. No. 6,115,528A

What is claimed is:

1. A sensor device operable to sample data from a fluid in a sealed environment, wherein the sensor comprises:
   a housing;
   a diamond;
   a first sealing device located on a first side of the diamond, the first side of the diamond being configured to interface directly with the sealed environment;
   a second sealing device located on a second side of the diamond, the second side of the diamond being a side opposite the first side, wherein the second side of the diamond is configured to be sealed apart from the sealed environment by the second sealing device located on the second side of the diamond; and
   a cartridge configured to be inserted into the housing from the second side of the diamond, wherein the cartridge is configured to, when inserted into the housing, compress the second sealing device between the cartridge and the diamond, and compress the first sealing device between the housing and the diamond,
   wherein the cartridge comprises a central conduit configured to receive one or more electrical or optical connections.

2. The device according to claim 1, wherein the diamond is shaped approximately like a disk, and one face of the diamond directly interfaces with the sealed environment.

3. The device according to claim 2 where the diameter of the diamond is no greater than 30 mm.

4. The device according to claim 1, where the thickness of the diamond is no greater than 4 mm.

5. The device according to claim 1, where the diamond is either polycrystalline or monocrystalline.

6. The device according to claim 1, where the electrical properties of the diamond have been adjusted through the purposeful inclusion of impurities.

7. The device according to claim 6 where the impurities include but are not limited to boron, phosphorus and/or graphitic material.

8. The device according to claim 6 where the impurities are distributed within the diamond to provide localized electrical properties.

9. The device according to claim 8 whereby there is a concentric circular variation in the electrical properties on the surface of the diamond.

10. The device according to claim 6 where the impurities are distributed within the diamond to generate one or more layers of insulating, conducting or semiconducting diamond.

11. The device according to claim 1, further comprising electrically conducting pathways extending from one side of the diamond which is in contact with the sealed environment to an opposing side of the diamond.

12. The device according to claim 11 where the electrical conducting pathways are graphitic in nature.

13. The device according to claim 11 where the electrical conducting pathways are metallic or semi-metallic in nature.

14. The device according to claim 1, where the diamond is transparent to wavelengths in the range 0.23-100 µm.

15. The device according to claim 1, where the diamond is coated in an anti-reflective coating, or where the shape of the diamond is configured to be anti-reflective, to enhance transmission of low intensity optical signals.

16. The device according to claim 1, where the device is adapted for use with a sealed environment having a static or dynamic temperature in the range −55 through to +350° C.

17. The device according to claim 1, where the device is adapted for use with a sealed environment having a pressure up to 200 bar.

18. The device according to claim 1, where the device is adapted for use with a sealed environment having any pH value in the range 1-14.

19. The device according to claim 1, where the device is adapted for use with a sealed environment having an enhanced level of ionizing radiation compared with background radiation level.

20. The device according to claim 1, wherein the first sealing device is a leak resistant seal to preserve the sealed environment located on the first side of the diamond.

21. The device according to claim 20 where the seal is a mechanical seal, optionally formed by gaskets, O-rings or c-rings.

22. The device according to claim 20 where the seal is a fusion seal, optionally a braze, weld or frit seal.

23. The device according to claim 1, wherein the housing is adapted for insertion into a larger structure containing the sealed environment.

24. The device according to claim 1, where the housing is in the form of a mechanical bolt.

25. The device according to claim 24 whereby optical and electronic components are contained within the bolt.

26. The device according to claim 23, wherein the device is integrated into a pipe-section.

27. The device according to claim 1, further comprising whereby optical and/or electronic connectivity for linking to an external storage unit located outside the sealed environment.

28. The device according to claim 1, wherein the diamond acts as a passive window for passing a sensing signal into and/or receiving a sensing signal from the sealed environment.

29. The device according to claim 28, wherein the sensing signal comprises an optical (visible or infrared) or electrical signal.

30. The device according to claim 1, wherein the diamond acts as an active sensing device for performing electrical measurements of the fluid in the sealed environment.

31. The device according to claim 1, wherein the device is adapted for repeated insertion into, and removal from, the sealed environment.

32. The device according to claim 1, wherein the second sealing device is made from graphite or gold.

* * * * *